March 25, 1947.  N. FLESCH  2,418,022
BRAKE HEAD BALANCING DEVICE
Filed Sept. 22, 1944
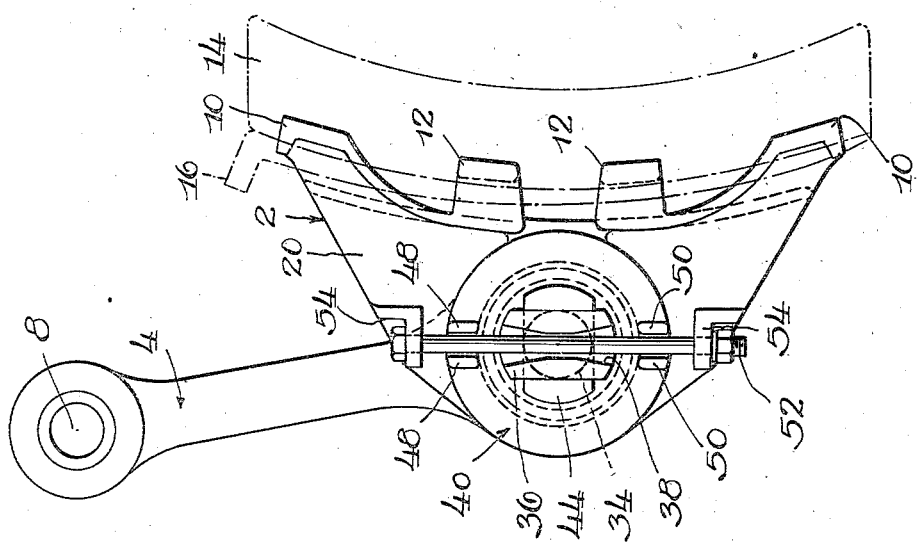
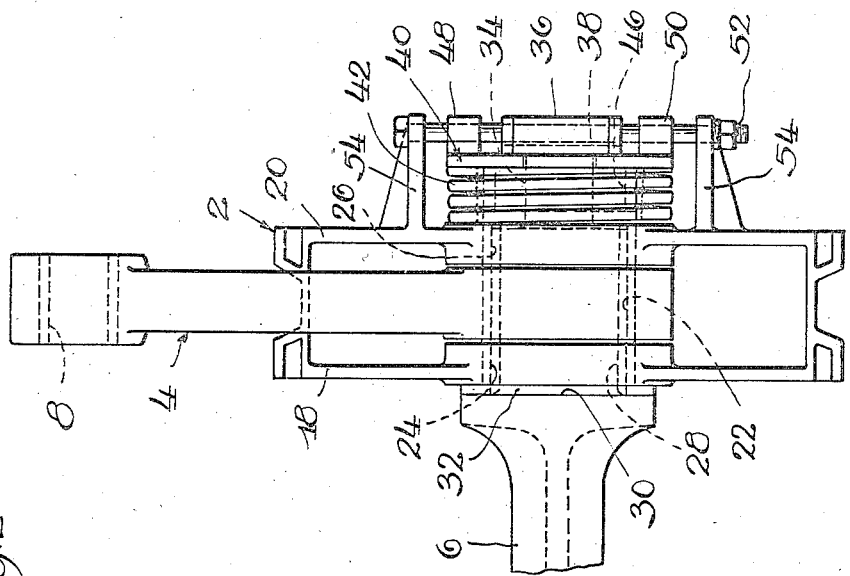
INVENTOR.
Norman Flesch
BY
Atty Patented Mar. 25, 1947

2,418,022

UNITED STATES PATENT OFFICE 2,418,022

BRAKE HEAD BALANCING DEVICE

Norman Flesch, Chicago, Ill., assignor to American Steel Foundries, Chicago, Ill., a corporation of New Jersey Application September 22, 1944, Serial No. 555,219

15 Claims. (Cl. 188—230)

My invention relates to brake equipment and more particularly to what is commonly known as a brake head balancing device comprising friction means for yieldably maintaining a brake head in position relative to an associated support member.

In the illustrated embodiment of my invention, the balancing device is applied to an arrangement in which brade head and hanger members are pivotally mounted on the trunnion of an associated beam, which comprises a shoulder frictionally engaging one of the members, and the balancing device includes a spring for urging said member into frictional engagement with said shoulder.

The general object of my invention is to devise a balancing device of the above-described type, wherein the device is maintained in assembled relationship without the use of a threaded member, which is commonly utilized in such an arrangement for achieving the desired spring pressure in order to obtain the necessary friction.

In my novel arrangement, a bolt and nut assembly is utilized as auxiliary means for preventing accidental disassembly of the device. However, the device includes novel means for maintaining the parts thereof in assembled relationship, even though the bolt and nut assembly should become disconnected due to breaking or the extreme vibrations to which such a device is subject under railway conditions.

A specific object of my invention is to provide a spring plate or abutment member having a novel bayonet-like connection to the pivot member or beam, a spring being compressed against the abutment member for urging the brake head and hanger assembly against a shoulder of the pivot member, thereby affording the desired friction.

Another object of my invention is to provide novel means on the brake head member cooperating with means on the brake beam or pivot member for limiting relative pivotal movement between said members in the event that the spring should become broken in service.

Still another object of my invention is to interlock the before-mentioned spring plate or abutment member with the brake head member, thus eliminating torsional stresses on the spring which, in the illustrated embodiment, is compressed between the brake head member and the spring plate for urging the former against the shoulder on the beam.

In the drawings, Figure 1 is a side elevation of the preferred embodiment of my invention and Figure 2 is a rear elevation taken from the left, as seen in Figure 1.

Describing my novel arrangement in detail, the invention is illustrated as applied to a well-known type of brake rigging in which a brake head, generally designated 2, is pivotally connected to a hanger, generally designated 4, by means of a brake beam 6, to which actuating means, such as a brake lever (not shown), is connected in conventional manner, as will be clearly understood by those skilled in the art.

The hanger 4 is provided at its upper end with a bushed opening 8 for pivotal connection to the frame of an associated vehicle, such as, for example, a railway car truck, and the brake head 2 comprises at its forward end spaced end lugs 10, 10 and spaced intermediate lugs 12, 12 to which a brake shoe 14 is connected in conventional manner, as seen in Figure 1, by a key 16. The brake head comprises spaced walls or lugs 18 and 20, receiving therebetween the lower end of the hanger 4, which is provided with a bushed opening 22 (Figure 2) in alignment with bushed openings 24 and 26 in the spaced inboard and outboard walls 18 and 20, respectively, of the brake head.

The brake beam 6 includes a bushed trunnion end 28 extending through the openings 22 to 26 to afford a pivotal connection between the head and the hanger and to provide for the transmission of braking forces to the head and hanger assembly from the actuating means (not shown) connected to the beam. The inboard end of the trunnion end 28 terminates in a shoulder 30 on the beam, to which a wear plate 32 may be secured in any desired manner, as, for example, by welding, said plate being adapted for frictional engagement, as hereinafter described, with the inboard brake head wall 18. It will be understood by those skilled in the art that, if desired, the wear plate 32 may be eliminated and the brake head may bear directly against the shoulder 30 of the beam, so that the plate 32 may, for functional purposes, be regarded as a part of the beam itself.

Adjacent its outboard end, the beam is machined to form a portion 34 of reduced diameter terminating at its outboard end in an elongated end portion or head 36, having a slot or opening 38 therethrough serving a purpose hereinafter described.

A spring plate or abutment member, generally designated 40, is provided for transmitting reactiton of the spring 42 to the beam 6, the inboard end of said spring being compressed against the outboard wall 20 of the brake head, whereby the inboard wall 18 thereof is urged into frictional engagement with the before-mentioned wear plate 32. The plate 40 is provided with an elongated slot or opening 44 therethrough, said opening being complementary to the before-mentioned head or end portion 36 of the beam, and it will be clearly seen in Figure 1 that the opening 44 is angularly disposed with respect to the head 36 to afford an interlock between said head and the plate.

In the preferred embodiment illustrated, the opening 44 is approximately perpendicular to the head 36; however, it will be understood by those skilled in the art, that the head may be of any desired configuration other than round, as seen in the end view of Figure 2, provided that the complementary opening 44 in the spring plate is of approximately the same configuration, so that the opening 44 may be registered with the head 36 to permit the plate 40 to be urged inboardly of the head 36, thus compressing the spring 42. Thereafter the plate may be rotated so that it becomes interlocked with the head 36. Inasmuch as this method of assembly is analogous to what is generally known as a bayonet connection, the interlock between the plate 40 and the head 36 may be regarded as a bayonet-like joint or connection, and, as thus regarded, it will be readily apparent that the head 36 and the complementary opening 44 in the plate 40 may be of any configuration other than round, such as, for example, square or triangular.

The plate 40 comprises on its inboard side an annular flange 46 sleeved within the spring 42 for positioning the same, and the outboard side of the plate 40 is formed with spaced upper lugs 48, 48 and spaced lower lugs 50, 50, to afford an interlock between the plate 40 and the bolt and nut assembly 52, connected at opposite ends thereof to lugs 54, 54 integrally formed with the outboard brake head wall 20, said bolt and nut assembly passing between the pair of spaced lugs 48, 48 and the pair of spaced lugs 50, 50 on the spring plate 40. It will be understood that by means of the bolt and nut assembly 52 and its connection with the plate 40, the latter is interlocked against substantial relative torsional movement with respect to the brake head 2, so that, as the latter pivots on the trunnion end of the beam 6 to accommodate wear of the brake shoe 14 under service conditions, the plate 40 pivots with the brake head, thereby preventing any substantial torsional stress of the spring 42.

It may be noted that the slot 38, as seen in Figure 1, is flared toward the upper and lower extremities thereof to permit the before-mentioned pivotal or rotational movement of the brake head 2 and spring plate 40 relative to the beam 6. However, in the event that the spring 42 should become broken, as sometimes occurs under the severe conditions to which a device of this type is subjected, the pivotal movement of the head and plate 40 will be limited by abutment of the bolt and nut assembly 52 with the flared margins of the slot 38, thus preventing extreme rotation of the head to a point at which it might be knocked off the beam thereby creating the danger of derailment.

It will be understood that in the event that the bolt and nut assembly 52 should become broken or accidentally disassembled, the before-mentioned bayonet-like connection between the spring plate 40 and the head or end portion 36 of the beam 6 will maintain the spring plate 40 in assembled relationship so that the pressure of the spring 42 will still be operable to afford friction between the plate 32 and the wall 18.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake head balancing device, brake head and support members, a pair of spaced rigid means on one of said members receiving therebetween a portion of the other member, a nonrotatable pivot member having a shoulder frictionally engaging one of said rigid means, said pivot member extending through aligned openings in said rigid means and said portion to afford a pivotal connection therebetween, a portion of reduced cross-sectional area on said pivot member terminating in an elongated head at the end thereof, a spring plate with an elongated opening complementary to said head, said plate being movable axially and rotatably with respect to said pivot member to accommodate entrance of said head into said opening and subsequent rotation of said plate, said opening receiving therewithin said reduced portion and being angularly related to said head, thereby affording an interlock between said head and said plate, resilient means compressed between said plate and the other of said rigid means, and means on said head and the adjacent rigid means adapted for abutment to limit pivotal movement of the brake head member relative to said pivot member.

2. In a brake head balancing device, brake head and support members, a pair of spaced rigid means on one of said members receiving therebetween a portion of the other member, a nonrotatable pivot member having a shoulder frictionally engaging one of said rigid means, said pivot member extending through aligned openings in said rigid means and said portion to afford a pivotal connection therebetween, a portion of reduced cross-sectional area on said pivot member terminating in an elongated head at the end thereof, a spring plate with an elongated opening complementary to said head, said plate being movable axially of said pivot member and pivotally thereon to accommodate entrance of said head into said opening and subsequent pivoting of said plate, said opening receiving therewithin said reduced portion and being angularly related to said head, thereby affording an interlock between said head and said plate, resilient means compressed between said plate and the other of said rigid means, and interlocking means carried by said other rigid means and interlocked with the plate, said interlocking means cooperating with means on said head for limiting pivotal movement of the brake head member relative to said pivot member.

3. In a brake head balancing device, a brake head member with spaced walls, a support member therebetween, a nonrotatable pivot member extending through aligned openings in said walls and support member to afford a pivotal connection therebetween, a shoulder on said pivot member frictionally engaging one wall, said pivot member having a portion of reduced cross-sectional area terminating in a flat elongated end portion, a spring plate bearing against the inner surface of said end portion and having an elongated opening complementary in shape to that of said end portion but angularly disposed with respect thereto, thereby affording an interlock between said plate and said end portion, said plate being movable axially and rotatably with respect to said reduced portion of said pivot member, resilient means compressed between said plate and the other wall, and rigid means carried by the head member and interlocked with said plate, said rigid means cooperating with abutment means on said end portion for limiting relative pivotal movement of said head member relative to said pivot member.

4. In a brake head balancing device, a brake head member with spaced walls, a support member therebetween, a nonrotatable pivot member extending through aligned openings in said walls and support member to afford a pivotal connection therebetween, a shoulder on said pivot member frictionally engaging one wall, said pivot member having a portion of reduced cross-sectional area terminating in a flat elongated end portion, a spring plate bearing against the inner surface of said end portion and having an elongated opening complementary in shape to that of said end portion but angularly disposed with respect thereto, thereby affording an interlock between said plate and said end portion, said plate being movable axially and rotatably with respect to said reduced portion of said pivot member, resilient means compressed between said plate and the other wall, and cooperating means on said head member and end portion for limiting pivotal movement of said head member relative to said pivot member.

5. In a brake head balancing device for an assembly including a brake head member with spaced inboard and outboard walls, a support member therebetween, and a beam having a shoulder engaging the inboard wall and comprising a trunnion extending through aligned openings in said walls and support member to afford a pivotal connection therebetween; the combination of a compressed spring sleeved over at portion of said trunnion in abutment with the outboard wall and abutment means interlocked with said trunnion against relative axial movement thereon in the direction away from said head, said abutment means being pivotal with respect to said trunnion and affording a seat for the outboard end of said spring, and rigid means interlocking said abutment means with said head against relative pivotal movement with respect thereto, said rigid means extending through a slot in said trunnion for cooperation with certain margins thereof to limit pivotal movement of said head on said beam.

6. In a brake head balancing device, a brake head with spaced walls, a support member extending therebetween, a pivot member frictionally engaging one of said walls, said pivot member extending through aligned openings in said walls and said support member to afford a pivotal connection therebetween, said pivot member having a portion of reduced diameter terminating in an elongated lug with a slot therein, a spring plate sleeved over said portion in abutment with said elongated lug and having an opening complementary thereto and angularly disposed with respect thereto, said plate being movable axially of said pivot member and rotatably on said reduced portion thereof to accommodate entrance of said lug into said opening and subsequent rotation of said plate, a spring compressed between said plate and the other wall, and securing means carried by said other wall and extending through said slot for abutment with margins thereof to limit pivotal movement of said brake head on said pivot member.

7. In a brake head balancing device, brake head and support members, spaced rigid means on one of said members receiving therebetween a portion of the other member, a pivot member having a shoulder frictionally engaging one of said rigid means, said pivot member extending through complementary openings in said rigid means and said portion to afford a pivotal connection therebetween, a portion of reduced cross-sectional area on said pivot member terminating in an elongated head at the end thereof, a spring plate with an elongated opening corresponding in configuration to that of said head and receiving said reduced portion, said opening being angularly related to said head to afford an interlock between said head and said plate, said plate being movable axially and rotatably with respect to said reduced portion of said pivot member and resilient means compressed between said plate and the other rigid means for urging said one rigid means against said shoulder.

8. In a brake head balancing device, brake head and lever members, a beam with a trunnion extending through aligned openings in said members, said trunnion having a portion of reduced cross-section terminating in a nonround head, a spring plate with an opening complementary to said head, said plate being movable axially and rotatably with respect to said reduced portion of said trunnion, said portion extending through said opening, and said plate being rotated to a point at which said head cannot pass through said opening, resilient means under compression between said plate and abutment means on the adjacent member whereby one of said members is urged into frictional engagement with a portion of the beam inwardly of said trunnion, positioning means on said plate for said resilient means, and means interlocking said plate with said adjacent member against relative rotational movement on said trunnion.

9. In a brake head balancing device, a brake beam having a trunnion terminating at its inboard end in a shoulder, a brake head assembly pivotally mounted on said trunnion and comprising brake head and hanger members with aligned openings receiving said trunnion, an abutment member rotatably mounted on a portion of said trunnion adjacent the outboard end thereof and interlocked with said trunnion against outboard movement with respect thereto, a coil spring sleeved over said trunnion under compression between said abutment member and one of said first-mentioned members, positioning means on said abutment member sleeved within said spring, and means interlocking said abutment member with said one member against substantial relative rotation with respect thereto, whereby torsional stresses on said spring are substantially eliminated.

10. In a brake head balancing device for an assembly including a brake head member with spaced inboard and outboard walls, a support member therebetween, and a beam having a shoulder engaging the inboard wall and comprising a trunnion extending through aligned openings in said walls and support member to afford a pivotal connection therebetween; the combination of a compressed spring sleeved over a portion of said trunnion in abutment with the outboard wall and abutment means pivotally mounted on said trunnion and interlocked with said trunnion against movement outboardly thereof, said abutment means affording a seat for the outboard end of said spring, and rigid means interlocking said abutment means with said head against relative pivotal movement with respect thereto.

11. In a brake head balancing device, brake head and lever members, a beam with a trunnion extending through aligned openings in said members, said trunnion having a portion of reduced cross-section terminating in a nonround head, a spring plate with an opening complementary to said head and surrounding said portion, said plate being movable axially of said portion and rotatable to a point at which said head cannot pass through said opening, resilient means under compression between said plate and abutment means on the adjacent member, and a rigid member carried by said adjacent member and interlocked with the plate, said rigid member being engageable with means on said nonround head for limiting pivotal movement of said head on said trunnion.

12. In a brake head balancing device, a brake head with spaced lugs, a support member extending therebetween, a nonrotatable cylindrical pivot member frictionally engaging one of said lugs, said pivot member extending through aligned openings in said lugs and said support member to afford a pivotal connection therebetween, said pivot member having a portion of reduced diameter terminating in an elongated lug, a spring plate sleeved over said portion in abutment with said lug, said plate having an opening therethrough complementary to said elongated lug and angularly disposed with respect thereto, said plate being movable axially of said portion and rotatably thereon, and a spring compressed between said plate and the other brake head lug.

13. In a brake head balancing device for an assembly including a brake head member with spaced inboard and outboard walls, a support member therebetween, a beam having a shoulder engaging one of said members and comprising a trunnion extending through aligned openings in said walls and support member to afford a pivotal connection therebetween; the combination of a compressed spring sleeved over a portion of said trunnion in abutment with the outboard wall and an abutment member affording a seat for the outboard end of said spring and having a bayonetlike interlock with a portion of said trunnion adjacent the outboard end thereof to prevent outboard movement of said abutment member with respect thereto, said spring maintaining said interlock between said abutment member and said portion and simultaneously urging said one member against said shoulder for frictional engagement therewith.

14. In a brake head balancing device, brake head and lever members, a beam with a trunnion extending through aligned openings in said members, said trunnion having a portion of reduced cross-section terminating in a nonround head, a spring plate with an opening complementary to said head and receiving said portion, said plate being movable axially of said portion and being rotatable thereon to a point at which said head cannot pass through said opening, and resilient means under compression between said plate and abutment means on the adjacent member, whereby one of said members is urged into frictional engagement with a portion of the beam disposed inwardly of said trunnion.

15. In a brake head balancing device, brake head and support elements, a pivot member extending through aligned openings in said elements to afford a pivotal connection therebetween, said pivot member having a portion of reduced cross-section terminating in an elongated head, a spring plate having an opening complementary to said head and receiving said portion, said plate being movable axially of said portion and rotatably thereon, said opening and said head being angularly related to afford an interlock between said head and said plate, and resilient means sleeved over said portion under compression between said plate and the adjacent element.

NORMAN FLESCH.

REFERENCES CITED

The following references are of record in the file of this patent:

UNITED STATES PATENTS

| Number | Name | Date |
|---|---|---|
| 2,010,531 | Baselt | Aug. 6, 1935 |
| 2,281,535 | Drews | Apr. 28, 1942 |